(12) United States Patent

Van Dyke et al.

(10) Patent No.: US 7,271,812 B2
(45) Date of Patent: Sep. 18, 2007

(54) METHOD AND APPARATUS FOR COLOR SPACE CONVERSION

(75) Inventors: Phil Van Dyke, Surrey (CA); Raymond Chow, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 511 days.

(21) Appl. No.: 10/666,063

(22) Filed: Sep. 18, 2003

(65) Prior Publication Data

US 2005/0062756 A1  Mar. 24, 2005

(51) Int. Cl.
*G09G 5/02* (2006.01)
(52) U.S. Cl. .................. 345/603; 345/604; 382/167
(58) Field of Classification Search ............... None
See application file for complete search history.

(56) References Cited

U.S. PATENT DOCUMENTS

| | | | |
|---|---|---|---|
| 4,758,881 A | 7/1988 | Laspada | |
| 5,081,450 A | 1/1992 | Lucas et al. | |
| 5,506,604 A | 4/1996 | Nally et al. | |
| 5,745,186 A | 4/1998 | Shimizu et al. | |
| 5,784,050 A | 7/1998 | Corry | |
| 5,808,630 A | 9/1998 | Pannell | |
| 5,844,532 A | 12/1998 | Silverbrook et al. | |
| 5,920,322 A * | 7/1999 | Ulichney | 345/604 |
| 6,005,546 A | 12/1999 | Keene | |
| 6,125,202 A | 9/2000 | Kagawa et al. | |
| 6,304,269 B1 | 10/2001 | Ito | |
| 6,310,659 B1 | 10/2001 | Glen | |
| 6,353,440 B1 | 3/2002 | Keene | |
| 6,434,268 B1 | 8/2002 | Asamura et al. | |
| 6,459,437 B1 | 10/2002 | Sekino et al. | |
| 6,486,889 B1 | 11/2002 | Meyers et al. | |
| 2001/0017658 A1 | 8/2001 | Kuroiwa | |
| 2002/0030652 A1 | 3/2002 | Shibata et al. | |
| 2002/0060693 A1 | 5/2002 | Ito | |
| 2002/0191104 A1 | 12/2002 | Matsutani et al. | |
| 2003/0007686 A1* | 1/2003 | Roever | 382/167 |
| 2003/0016373 A1 | 1/2003 | Asamura et al. | |
| 2003/0132906 A1* | 7/2003 | Tanaka et al. | 345/89 |

FOREIGN PATENT DOCUMENTS

| | | |
|---|---|---|
| JP | 8-317309 | 11/1996 |
| JP | 10-210501 | 8/1998 |
| JP | 2001-8230 | 1/2001 |

* cited by examiner

*Primary Examiner*—Mark Zimmerman
*Assistant Examiner*—Kevin Xu

(57) ABSTRACT

A method for converting between color space formats initiates with identifying a first color space format. Then, both an offset parameter and a scale parameter are selected. The offset parameter and the scale parameter are associated with the first color space format. A conversion matrix configured to convert values associated with the first color space format to a second color space format is identified. When to apply the offset parameter and the scale parameter in relation to application of the conversion matrix is determined, i.e., to the input for the conversion matrix or to the output from the conversion matrix. A computer readable medium, a display controller and an integrated circuit are also included.

17 Claims, 4 Drawing Sheets

$$\underset{100}{\begin{bmatrix} R \\ G \\ B \end{bmatrix}} = \underset{102}{\begin{bmatrix} Ery & Eru & Erv \\ Egy & Egu & Egv \\ Eby & Ebu & Ebv \end{bmatrix}} \cdot \underset{104}{\begin{bmatrix} Y \\ U \\ V \end{bmatrix}}$$

Fig. 1 *(prior art)*

$$\underset{118}{\begin{bmatrix} X \\ Y \\ Z \end{bmatrix}} = \left\{ \underset{114}{\begin{bmatrix} Xscale \\ Yscale \\ Zscale \end{bmatrix}} \cdot \left( \underset{112}{\begin{bmatrix} Xa & Xb & Xc \\ Ya & Yb & Yc \\ Za & Zb & Zc \end{bmatrix}} \cdot \left( \left( \underset{108}{\begin{bmatrix} Ascale \\ Bscale \\ Cscale \end{bmatrix}} \cdot \underset{106}{\begin{bmatrix} A \\ B \\ C \end{bmatrix}} \right) + \underset{110}{\begin{bmatrix} Aoff \\ Boff \\ Coff \end{bmatrix}} \right) \right) \right\} + \underset{116}{\begin{bmatrix} Xoff \\ Yoff \\ Zoff \end{bmatrix}}$$

Fig. 2

METHOD AND APPARATUS FOR COLOR SPACE CONVERSION

CROSS REFERENCE TO RELATED APPLICATIONS

This application is related to U.S. patent application Ser. No. 10/666,438, filed on the same day as the instant application and entitled "YUV DISPLAY BUFFER." This application is hereby incorporated by reference in its entirety for all purposes.

BACKGROUND OF THE INVENTION

1. Field of the Invention

This invention relates generally to computer systems and more particularly to a method and apparatus for converting between various color space formats.

2. Description of the Related Art

Current liquid crystal display (LCD) controller designs incorporate display buffers that only support display data in RGB format. As is generally known, RGB format display data varies in color depth from 8, 16, or 24 bit-per-pixel (bpp). Newer LCD controllers incorporating digital video features, such as video input ports, JPEG, and MPEG functionality, require 16 or 24 bpp color depths to properly display live video or still images. Typically, the display data coming from various modules are converted to RGB format before storage into the display buffer.

For current generations of LCD controllers that support a camera interface and a JPEG CODEC, incoming YUV data from these modules are first converted to 16 bpp or 24 bpp (unpacked 32-bits wide) RGB data format by a YUV-RGB Converter (YRC). The converted data is then stored in the display buffer. In order to convert between YUV/Y'CbCr data (digital video signal format) and RGB data (display data format) and vice versa, a YRC (YUV-RGB Converter) or RYC (RGB-YUV Converter) is used. These converters use the standard equations for converting between these two formats.

FIG. 1 is an exemplary illustration of the equation for a typical YUV-RGB implementation. Here, RGB components 100 are the red/green/blue color components, YUV components 104 are the luminance and chrominance components, and 3×3 matrix 102 contains the conversion coefficients. Thus, the conversion process may be fixed to 4 or 5 processes, or even fewer, depending on the number of hard coded alternatives. Additionally, changes to the color characteristics, e.g., contrast, brightness, hue, color balance, etc., which affects the entire display, requires the computationally intensive reprogramming of a 256 bit look up table (LUT) or any other suitably sized LUT. This reprogramming consumes the limited resources, i.e., power and memory, of handheld devices, not to mention the delays that may be caused. Another shortcoming with the hard coded conversion process is that the input signal may not be easily adjusted independent of a color look up table, i.e., in order to adjust the input signal scaling and offset, changes must be made to the 3×3 matrix by first recalculating all 9 coefficients and then reprogramming the 3×3 matrix. However, the resulting values are not easily converted to show the intended change.

As a result, there is a need to solve the problems of the prior art to provide a color space conversion system and method that may linearly adjust the input to and the output from the conversion matrix independent of the color look up table efficiently.

SUMMARY OF THE INVENTION

Broadly speaking, the present invention fills these needs by providing a method and apparatus for color space conversion where the color space conversion values are programmable via a register setting. It should be appreciated that the present invention can be implemented in numerous ways, including as a process, a system, or a device. Several inventive embodiments of the present invention are described below.

In one embodiment, a method for converting between color space formats is provided. The method initiates with identifying a first color space format. Then, both an offset parameter and a scale parameter are selected. The offset parameter and the scale parameter are associated with the first color space format. A conversion matrix configured to convert values associated with the first color space format to a second color space format is identified. When to apply the offset parameter and the scale parameter in relation to application of the conversion matrix is determined, i.e., to the input for the conversion matrix or to the output from the conversion matrix.

In another embodiment, a computer readable medium having program instructions for converting between color space formats is provided. The computer readable medium includes program instructions for identifying a first color space format. Program instructions for selecting both an offset parameter and a scale parameter associated with the first color space format are provided. Program instructions for identifying a conversion matrix configured to convert values associated with the first color space format to a second color space format and program instructions for determining when to apply the offset parameter and the scale parameter in relation to application of the conversion matrix are included.

In yet another embodiment, a display controller is provided. The display controller includes an input port configured to receive video data from an external device. The display controller also includes a programmable register block configured to store color space conversion factors and a color space conversion block configured toe convert the video data between color space formats. The color space conversion block is capable of applying the color space conversion factors to an input to the color space conversion block and/or an output from the color space conversion block. The application of the color space conversion factors are based upon a type of color format associated with the received video data.

In another embodiment, an integrated circuit is provided. The integrated circuit includes circuitry for storing color space conversion factors. The color space conversion factors include matrix conversion factors, scaling factors and offset factors. Circuitry for receiving video input data associated with a first color space format is provided. Circuitry for applying selected color space conversion factors to the received video input data is included. The circuitry for applying selected color space conversion factors includes circuitry for adjusting a contrast characteristic of the video input data, and circuitry for adjusting a brightness characteristic of the video input data. Circuitry for applying a conversion matrix to convert the input video data to a second color space format is included in the circuitry for applying selected color space conversion factors, wherein the conversion to the input data occurs after either the contrast characteristic or the brightness characteristic have been adjusted.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 1 is an exemplary illustration of the equation for a typical YUV-RGB implementation.

FIG. 2 is a conversion equation associated with a color space conversion implementation where the factors for achieving the color space conversion correspond to a twenty one register implementation in accordance with one embodiment of the invention.

DETAILED DESCRIPTION OF THE PREFERRED EMBODIMENTS

Figure 3:
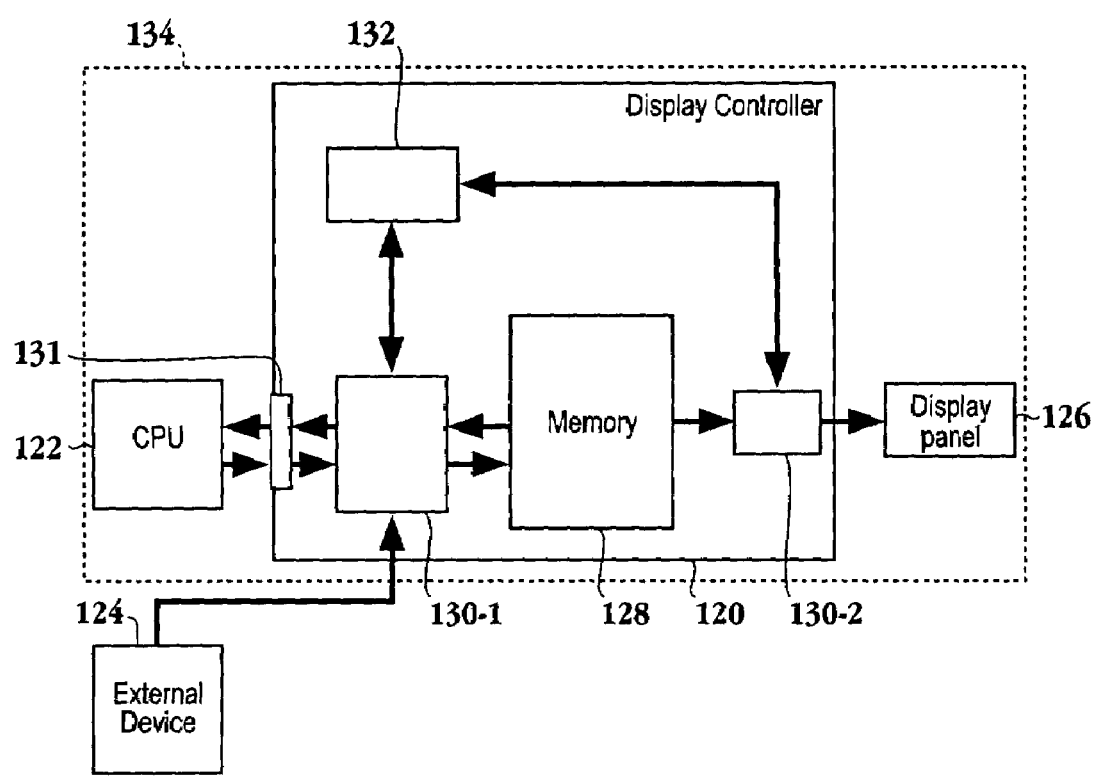
FIG. 3 is a simplified schematic diagram illustrating the components for a hardware implementation of a color space conversion scheme in accordance with one embodiment of the invention.

An invention is described for an apparatus and method for converting between various color space formats through programmable registers containing the color space conversion factors. It will be apparent, however, to one skilled in the art, in light of this disclosure, that the present invention may be practiced without some or all of these specific details. In other instances, well known process operations have not been described in detail in order not to unnecessarily obscure the present invention. FIG. 1 is described in the "Background of the Invention" section.

The embodiments of the present invention provide a color space conversion scheme accomplished through the use of programmable registers having the associated color space conversion factors. Thus, the embodiments described herein provide for the implementation of a color space conversion (CSC) block having each conversion coefficient, scaling value, and offset value programmable via a register setting. In one embodiment, a total of 21 registers require programming for the full functionality of the color space conversion block. One skilled in the art will appreciate that since the conversion coefficients are not hard coded, the multiple YUV-RGB or RGB-YUV conversion coefficient values need not be implemented, thereby decreasing the block size to conserve valuable chip real estate. As will be explained in more detail below, the programmable offset and scale parameters implemented through the registers provide additional linear adjustment to the input or output of the CSC block, e.g., camera video or JPEG CODEC output adjustment, independent of the display frame buffer color look-up table (LUT). Consequently, the adjusting of the LUT, which requires reprogramming of up to 256 registers and affects the entire display, is avoided. That is, rather than reprogramming the LUT, changing three registers accomplishes the desired linear adjustment.

FIG. 2 is a conversion equation associated with a color space conversion implementation where the factors for achieving the color space conversion correspond to a twenty one register implementation in accordance with one embodiment of the invention. Here, the input data color space format 106, which is illustrated as A, B, C color space format is multiplied by scaling factors 108, Ascale, Bscale, and Cscale, respectively. The product of the corresponding color space format values and scaling factors 108 is added to input offset factors 110, Aoff, Boff and Coff, respectively. The value associated with input 106, which is scaled by scaling factors 108 and offset through offset factors 110, is then converted to a second color space format through multiplication with conversion matrix 112. The value associated with the second color space format (output from conversion matrix 112) is then scaled according to output scaling factors 114 Xscale, Yscale, and Zscale. The scaled output value is then combined with output offset factors 116, Xoff, Yoff, and Zoff, respectively. The resulting value is equal to output 118, which represents the conversion of input 106 to a second color space format. As will be described in more detail below, the input offset and scale operations or the output offset and scale operations may be bypassed depending on the color space conversion format direction as well as the desired output configuration.

FIG. 3 is a simplified schematic diagram illustrating the components for a hardware implementation of a color space conversion scheme in accordance with one embodiment of the invention. Device 134 includes central processing unit (CPU) 122 in communication with display controller 120. Display controller 120 communicates display data to display panel 126, which is also included in device 134. It should be appreciated that device 134 may include any suitable handheld electronic device having a display panel, e.g., a cellular phone, a personal digital assistant (PDA), a web tablet, etc. In one embodiment, display controller 120 is a liquid crystal display (LCD) which controls a LCD panel. CPU 122 issues read and write commands to display controller 120. Where CPU 122 is associated with color space data having a color space format associated with RGB formatted data, and memory 128 of display controller 120 stores data in a YUV color space format, the data being transmitted between CPU 122 and memory 128, through input port 131 may be converted. Here, color space conversion module 130-1 is configured to perform the necessary color space conversion scheme.

In one embodiment, the color space conversion module 130-1 utilizes the equation discussed with reference to FIG. 2. That is, color space conversion module 130-1 may obtain the necessary coefficients in order to apply the equation with reference to FIG. 2, from programmable register block 132. In programmable register block 132, the matrix conversion factors, input scaling factors, input offset factors, output scaling factors, and output offset factors are stored in programmable registers within programmable register block 132 as illustrated in FIG. 3. Thus, color space conversion module 130-1 obtains the necessary coefficients from the corresponding programmable register within programmable register block 132. Additionally, data stored within memory 128 of display controller 120 may have a certain color space format which needs to be converted in order to display on display panel 126. Here, color space conversion module 130-2 may be used to convert the data from memory 128 in order to format the data for display panel 126.

In another embodiment, display controller 120 of FIG. 3, may receive color data from external device 124 rather than from host CPU 122. For example, external device 124 may be a device which provides digital input to display controller 120, e.g., a digital camera, a video decoder, a MPEG decoder, etc. Here again, the color space format associated with external device 124 may be different than the color space format with which display controller 120 operates. Therefore, color space conversion module 130-1 converts a format associated with the data from external device 124 so that display controller 120 may operate on the data.

Figure 4:
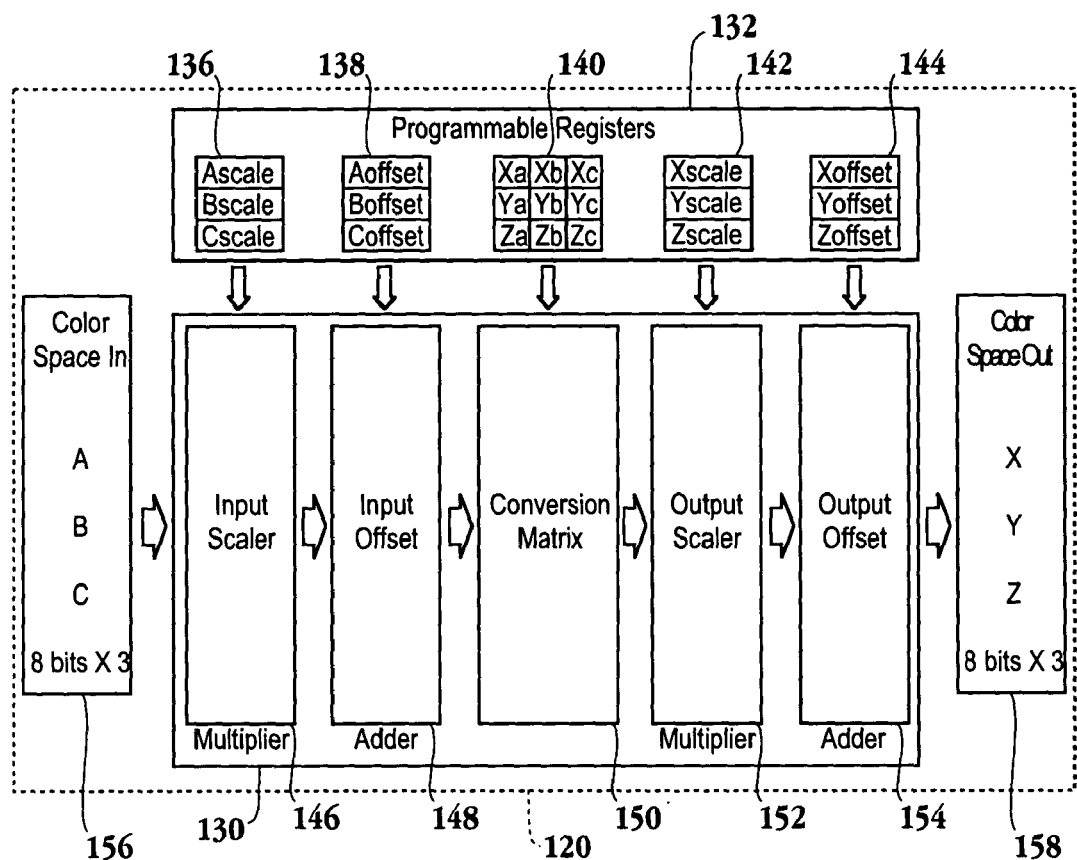
FIG. 4 is a more detailed illustration of the programmable register block and the color space conversion block of FIG. 3 in accordance with one embodiment of the invention.

FIG. 4 is a more detailed illustration of the programmable register block and the color space conversion block of FIG. 3 in accordance with one embodiment of the invention. Here, programmable register block 132 includes separate registers for each of the coefficient values from blocks 136, 138, 140, 142 and 144. Three registers are associated with input scaling factors 136 and an additional three registers are associated with input offset factors 138. Conversion matrix 140 includes nine coefficients (3×3), each of which is associated with a register. Output scaling factors 142 and output offset factors 144 each contain three coefficients which are captured in individual registers, similar to input scaling factors 136 and input offset factors 138. Color space conversion module 130, which corresponds to color space conversion modules 130-1 and 130-2 with reference to FIG. 3, includes input scaler 146 and input offset block 148. Input offset block 148 feeds into conversion matrix 150 which is in communication with output scaler block 152, which in turn outputs data to output offset block 154. As illustrated in FIG. 4, with reference to the equation of FIG. 2, input scaler block 146 is configured as a multiplier, while input offset block 148 is configured as an adder. Similarly, output scaler block 152 is configured as a multiplier while output offset block 154 is configured as an adder. Therefore, color space formatted data represented by input data 156 (A, B, C) is converted through color space conversion module 130 in order to transform input data 156 (A, B, C) to output conversion data 158 in the form of XYZ.

It should be appreciated that the embodiments described herein allow for much more user control of the color space conversion. Furthermore, the conversion may be defined between various color space formats including but not limited to YUV (or Y'CbCr) to RGB or RGB to YUV (or Y'CbCr) by simply reprogramming the $X_{subscript}$, $Y_{subscript}$, $Z_{subscript}$ coefficients. As mentioned above, the programmable offset and scale parameters implemented by registers provide additional linear adjustment to the input or output of the CSC block (camera video or JPEG CODEC output adjustment) independent of display frame buffer color look-up table (LUT). In addition, adjusting the LUT requires reprogramming up to 256 registers and affects the entire display. For example, if programmed as a YRC, changes to values Aoff, Boff, and Coff allows brightness and hue manipulation. Changes to Ascale, Bscale, and Cscale allows contrast and saturation manipulation, while changes to values of Xoff, Yoff, Zoff allows RGB color balance manipulation. In one embodiment, the color space matrix output, X, Y or Z, may be fixed to a desired value by programming "0" in the corresponding $X_{scale}$, $Y_{scale}$, and $Z_{scale}$ registers, i.e., for gray scale UV is fixed to 80 h. Thus, the CSC X, Y, Z output values could then be fixed to the values programmed in registers Xoff, Yoff or Zoff. In another embodiment, CSC conversion may be bypassed by programming "0" in the matrix register, except for the matrix diagonals Xa, Yb, and Zc, and by programming the Scale Registers, both of which are programmed "1."

Tables 1 and 2 illustrate exemplary settings for YUV to RGB conversion (YRC) and RGB to YUV (RYC) conversion, respectively.

TABLE 1

| Color Space Conversion Factor | SETTING | |
|---|---|---|
| | Ascale Setting | Bscale and Cscale Setting |
| Input Scaler | Byass or Contrast Adjust | Bypass or Color Gain Adjust |
| | Aoffset Setting | Boffset and Coffset Setting |
| Input Offset | Bypass or Brightness Adjust | Byass or Color Balance Adjust |
| Output Scaler and Output Offset | Bypass or Further individual RGB color adjust | |
| 3 × 3 Matrix | Xa = 1.000 Xb = 0.000 Xc = 1.402 | |
| | Ya = 1.000 Yb = 0.344 Yc = 0.714 | |
| | Za = 1.000 Zb = 1.772 Zc = 0.00 | |

TABLE 2

| Color Space Conversion Factor | SETTING | |
|---|---|---|
| | Xscale Setting | Yscale and Zscale Setting |
| Output Scaler | Byass or Contrast Adjust | Byass or Color Gain Adjust |
| | Xoffset Setting | Yoffset and Zoffset Setting |
| Output Offset | Byass or Brightness Adjust | Byass or Color Balance Adjust |
| Input Scaler and Input Offset | Bypass or Further individual RGB color adjust | |
| 3 × 3 Matrix | Xa = 0.2990 Xb = 0.5870 Xc = 0.1140 | |
| | Xa = 0.1690 Xb = 0.3310 Xc = 0.5000 | |
| | Xa = 0.5000 Xb = 0.4190 Xc = 0.0810 | |

As illustrated in Tables 1 and 2, the configuration of the conversion scheme enables the input to and the output from the conversion matrix to be adjusted independent of the LUT. For example, to adjust the brightness, three register values are changed rather than changing an entire LUT. Therefore, the color conversion scheme defined herein may selectively apply and modify scale and offset parameters before or after the application of a conversion matrix. That is the input data may be scaled and offset prior to conversion and/or the output data may be scaled and offset after conversion. In addition, the scale parameters may be applied independently of the offset parameters for either the input or output. Furthermore, in order to adjust the input scale and offset, there is no need to adjust the matrix coefficients with respect to the embodiments described herein.

Figure 5:
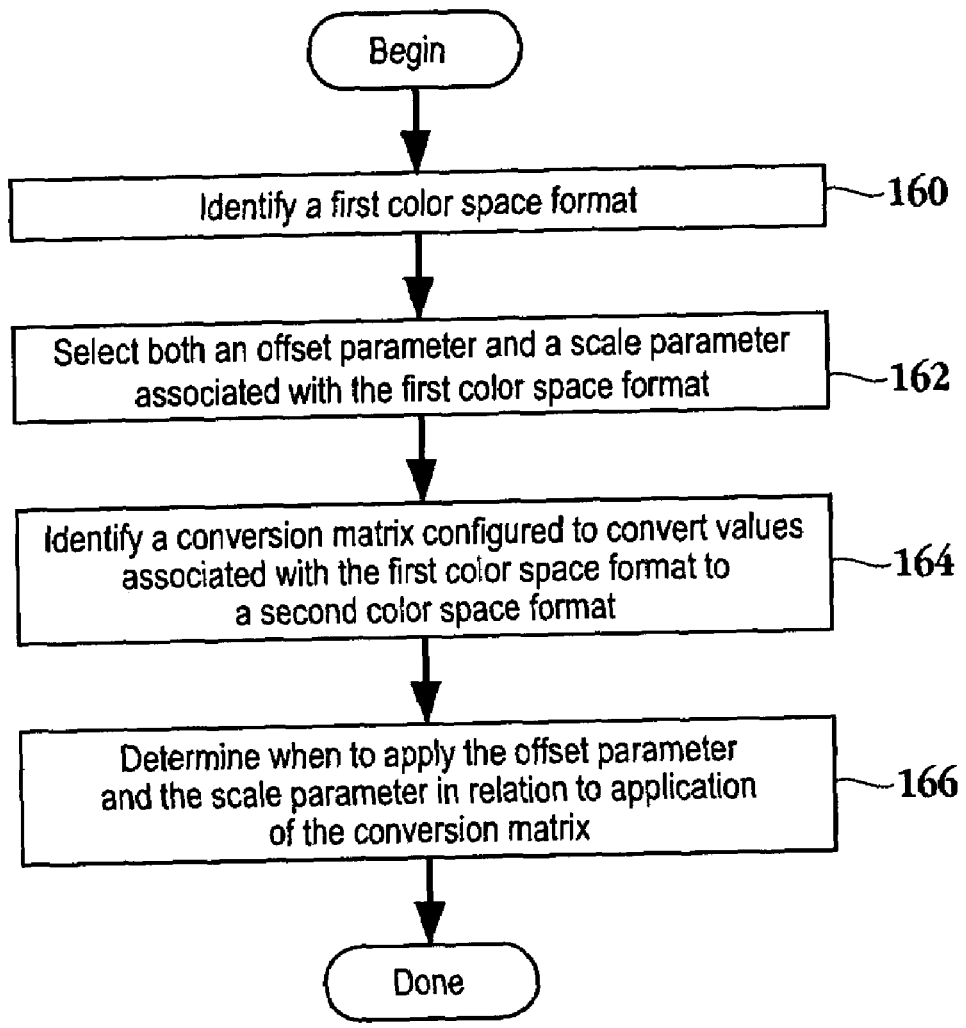
FIG. 5 is a flow chart diagram illustrating the method operations for converting between color space formats in accordance with one embodiment of the invention.

FIG. 5 is a flow chart diagram illustrating the method operations for converting between color space formats in accordance with one embodiment of the invention. The method initiates with operation 160 where a first color space format is identified. For example, the first color space format may be a YUV based format or an RGB based format. The method then advances to operation 162 where both an offset parameter and a scaled parameter associated with the first color space format are selected, e.g., from registers. Here, the input offset parameters and input scale parameters are selected with reference to FIGS. 2 through 4. It should be appreciated that the offset parameters and the scaled parameters are configured to manipulate characteristics associated with the input color format in order to prepare the input data for conversion. The method then proceeds to operation 164 where a conversion matrix is identified. The conversion matrix is configured to convert values associated with a first color space format to a second color space format. Here, each of the coefficients of the matrix is associated with a register. Exemplary conversion matrices are provided with reference to Tables 1 and 2. It should be appreciated that these conversion matrices are exemplary only and not meant to be limiting as any suitable conversion matrix may be used here. The method then moves to operation 166 where it is determined when to apply the offset parameter and the scaled parameter in relation to the application of the conversion matrix. That is, the offset and the scale factors may be applied before and/or after the conversion matrix is applied to the data. As listed in Tables 1 and 2, the application of the scale and offset factors effects certain color characteristics, e.g., contrast, color gain, brightness, color balance, hue, etc., depending on the type of conversion and the timing of when the factors are applied.

In summary, the above-described embodiments enable independent application for offset and scaling operations which may be applied before or after a matrix calculation. Furthermore, the independent application of the offset and scaling operations to the input occur without having to recalculate or otherwise change the matrix coefficients. It should be appreciated that the above described embodiments may be incorporated into any suitable display controller. In one embodiment, the display controller discussed in application Ser. No. 10/666,438 which has been incorporated by reference, includes the color space conversion scheme provided herein.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for converting between color space formats, comprising:
   identifying a first color space format;
   selecting both an offset parameter and a scale parameter associated with the first color space format;
   identifying a conversion matrix configured to convert values associated with the first color space format to a second color space format; and
   determining when to apply the offset parameter and the scale parameter either before or after application of the conversion matrix.

2. The method of claim 1, wherein the method operation of determining when to apply the offset parameter and the scale parameter in relation to application of the conversion matrix includes,
   identifying the first color space format as a YUV based color format and the second color space format as an RGB based color format;
   applying the offset parameter and the scale parameter prior to the application of the conversion matrix.

3. The method of claim 1, wherein the method operation of determining when to apply the offset parameter and the scale parameter in relation to application of the conversion matrix includes,
   identifying the first color space format as an RGB based color format and the second color space format as a YUV based color format;
   applying the offset parameter and the scale parameter after the application of the conversion matrix.

4. The method of claim 2, further comprising:
   manipulating a color balance characteristic associated with the RGB based color format; and
   outputting data associated with the RGB based color format.

5. The method of claim 4, wherein the method operation of manipulating a color balance characteristic associated with the RGB based color format includes,
   defining an other offset parameter;
   applying the other offset parameter after the application of the conversion matrix to the values.

6. The method of claim 1, wherein the method operation of selecting both an offset parameter and a scale parameter associated with the first color space format includes,
   adjusting one of a brightness characteristic and a hue characteristic through a value associated with the offset parameter.

7. The method of claim 1, wherein the method operation of selecting both an offset parameter and a scale parameter associated with the first color space format includes,
   adjusting a color balance characteristic through a value associated with the offset parameter.

8. The method of claim 1, wherein the method operation of selecting both an offset parameter and a scale parameter associated with the first color space format includes,
   adjusting one of a contrast characteristic and a saturation characteristic through a value associated with the scale parameter.

9. A computer readable medium having program instructions for converting between color space formats, comprising:
- program instructions for identifying a first color space format;
- program instructions for selecting both an offset parameter and a scale parameter associated with the first color space format;
- program instructions for identifying a conversion matrix configured to convert values associated with the first color space format to a second color space format; and
- program instructions for determining when to apply the offset parameter and the scale parameter either before or after application of the conversion matrix.

10. The computer readable medium of claim 9, wherein the program instructions for determining when to apply the offset parameter and the scale parameter in relation to application of the conversion matrix includes,
- program instructions for identifying the first color space format as a YUV based color format and the second color space format as an RGB based color format;
- program instructions for applying the offset parameter and the scale parameter prior to the application of the conversion matrix.

11. The computer readable medium of claim 9, determining when to apply the offset parameter and the scale parameter in relation to application of the conversion matrix includes,
- program instructions for identifying the first color space format as an RGB based color format and the second color space format as a YUV based color format;
- program instructions for applying the offset parameter and the scale parameter after the application of the conversion matrix.

12. The computer readable medium of claim 9, wherein the program instructions for selecting both an offset parameter and a scale parameter associated with the first color space format includes,
- program instructions for adjusting one of a brightness characteristic and a hue characteristic through a value associated with the offset parameter.

13. The computer readable medium of claim 9, wherein the program instructions for selecting both an offset parameter and a scale parameter associated with the first color space format includes,
- program instructions for adjusting a color balance characteristic through a value associated with the offset parameter.

14. The computer readable medium of claim 9, wherein the program instructions for selecting both an offset parameter and a scale parameter associated with the first color space format includes,
- program instructions for adjusting one of a contrast characteristic and a saturation characteristic through a value associated with the scale parameter.

15. A display controller for performing the method recited in claim 1.

16. An integrated circuit for performing the method recited in claim 1.

17. The integrated circuit of claim 16, wherein the integrated circuit is incorporated into a handheld electronic device having a liquid crystal display (LCD).

* * * * *